Patented Apr. 7, 1942

2,278,559

UNITED STATES PATENT OFFICE 2,278,559

ALKENYLOXY DIARYLAMINES

Philip T. Paul, Naugatuck, Conn., assignor to United States Rubber Company, New York, N. Y., a corporation of New Jersey No Drawing. Application March 16, 1939, Serial No. 262,180

2 Claims. (Cl. 260—571)

The present invention relates to new chemicals and more especially to alkenyloxy diarylamines.

This application is a continuation-in-part of my copending application Serial No. 164,527, filed September 18, 1937.

In general, alkenyloxy diarylamines may be prepared by treating an aromatic hydroxy material in an alcoholic sodium hydroxide solution with an alkenyl halide.

The substituted diarylamines for the purposes of the present invention, subscribe to the general formula:

$$A\text{—}O\text{—}R\overset{Y}{\underset{|}{\text{—}N\text{—}}}R'\text{—}X$$

where R and R' are each an aryl radical singly bonded to O and N, and N and X, respectively. They are preferably further unsubstituted, but may contain as further substituents in the aryl nucleus such as the following groups: amino, halogen, secondary or tertiary alkyl amino, secondary or tertiary arylamino, mercapto, alkyl mercapto, etc. Y is hydrogen; O is oxygen; N is nitrogen; A is an alkenyl group; X is hydrogen or an alkenyloxy group. In either or both A and X the alkenyl group may be further substituted with maintenance of the unsaturated bond as by any of the following groups: halogen, amino, hydroxyl, secondary or tertiary alkyl amino, secondary or tertiary aryl amino, mercapto, alkyl mercapto, alkoxy, aryloxy.

The preferred substituted diarylamines for the purpose of the present invention, subscribe to the general formula:

$$\overset{H}{\underset{|}{R\text{—}N\text{—}}}R'\text{—}O\text{—}A$$

where N is nitrogen; H is hydrogen; O is oxygen; R is an aromatic radical of the benzene, naphthalene or diphenyl series; R' is an arylene radical singly bonded to nitrogen and oxygen respectively; and A is an alkenyl group singly bonded to the oxygen, having the general formula —(C$_n$H$_{2n-1}$)

or in the case of an alkenyl group bearing a substituent represented by the formula:

—(C$_n$H$_{2n-2}$X)

where X may represent halogen, hydroxy, alkoxy, anilino, amino, mercapto, alkyl mercapto, etc. The aryl nuclei, R and R', may also contain substituents such as halogen, hydroxy, alkyl, aryl, amino, secondary alkyl amino, tertiary alkyl amino, alkenyloxy, anilino, mercapto, alkyl mercapto, tertiary aryl amino, etc.

Examples of the chemicals included in the present invention are:

2-allyloxy diphenylamine
3-allyloxy diphenylamine
4-ethyl 4'-allyloxy diphenylamine
4-nitro 4'-allyloxy diphenylamine
4-chlor 4'-allyloxy diphenylamine
2,4-diamino 4'-allyloxy diphenylamine
4-phenylamino 4'-allyloxy diphenylamine
4-isopropenyl 4'-allyloxy diphenylamine
Diallyloxy dinaphthylamine
3-allyloxy 5,5-dimethyl acridan
4-mercapto 4'-allyloxy diphenylamine
4-(methyl mercapto)-4'-allyloxy diphenylamine
4,4'-diallyloxy diphenylamine
2,4-dimethyl 4'-allyloxy diphenylamine
4-vinyloxy diphenylamine
4-allyloxy thio diphenylamine
4-dimethylamino 4'-cinnamyloxy diphenylamine (cis and trans)
4-diphenylamino 4'-allyloxy diphenylamine
4-(4-allyloxy anilino) 4'-allyloxy diphenylamine
4-methyl phenyl amino 2-allyloxy diphenylamine
2-(allyloxy phenyl amino) naphthalene
1-(cinnamyloxy phenyl amino) naphthalene
4-allyloxy diphenylamine
2-methallyloxy diphenylamine
3-methallyloxy diphenylamine
4-methallyloxy diphenylamine
4,4'-dimethallyloxy-diphenylamine
4-crotyloxy diphenylamine
4-isocrotyloxy diphenylamine
4-methyl vinyl carbinyloxy diphenylamine
4-(b-ethoxy) vinyloxy diphenylamine
4-allyloxy phenyl beta naphthylamine
2-allyloxy phenyl beta naphthylamine
4-methallyloxy phenyl alpha naphthylamine
4-methyl 4'-allyloxy diphenylamine
4-methyl 4'-methallyloxy diphenylamine
4-dimethylamino 4'-allyloxy diphenylamine
4-methyl phenylamino 4'-methallyloxy diphenylamine
4-allyloxy 4'-(methyl phenyl amino) diphenylamine
4-gamma chloroallyloxy diphenylamine
4-vinyloxy-4'-phenyl diphenylamine
4-cinnamyloxy diphenylamine
4-phenoxy 4'-allyloxy diphenylamine
4-anilino-4'-methallyloxy diphenylamine
4-anilino-4'-allyloxy diphenylamine
4-phenyl-4'-allyloxy diphenylamine The following examples constitute preferred embodiments of the invention but with no intention to restrict the invention thereto; the parts are given by weight.

*Example 1.*—Preparation of 4-allyloxy diphenylamine:

4-hydroxy diphenylamine (92.5 grams) are dissolved in a mixture of 40 cc. 36% sodium hydroxide and 60 cc. alcohol and the solution heated to boiling. With stirring and heating a solution of 42 cc. allyl chloride in 40 cc. alcohol is run in over a period of 45 minutes. Toward the end of the addition of the allyl chloride, the color lightens from a brown to a yellow. After all the allyl chloride has been added, the mixture is refluxed for half an hour and then drowned in water. The allyloxy diphenylamine is extracted with benzene or ether and the extract washed several times with dilute sodium hydroxide, and then with water. After drying, the solvent is evaporated and the residue, on standing, crystallizes. It is purified by recrystallizing from ligroin or alcohol.

*Analysis*

Melting point °C 46–47
Nitrogen:
  Theory per cent 6.23
  Found do 6.12

*Example 2.*—Preparation of 4-methallyloxy diphenylamine:

4-hydroxy diphenylamine (92.5 grams) are dissolved in a mixture of 40 cc. of 36% sodium hydroxide and 50 cc. alcohol, and the solution heated to reflux. With stirring and heating 60 cc. methallyl chloride is added in about 15 to 20 minutes. After the addition of the halide has been completed, refluxing is continued for 45 minutes, and then the reaction mixture is poured into 1,000 cc. cold water. An oil separates which soon solidifies. After washing twice with water, the crude product is purified by recrystallizing from alcohol, from which it separates in the form of pure white crystals melting at 72–73° C.

*Analysis*

Nitrogen:
  Theory per cent 5.84
  Found do 5.72

*Example 3.*—Preparation of 4-(gamma chloro allyloxy) diphenylamine (cis-trans mixture):

4-hydroxy diphenylamine (36.3 grams) are dissolved in a mixture of 16.8 cc. 35% sodium hydroxide and 50 cc. alcohol and the solution heated to reflux. A small amount of sodium hydrosulfite is added to reduce discoloration. With stirring and heating, 18.1 cc. dichloro propene is added over a period of two hours. Refluxing is continued for four hours after all the halide has been added. The reaction mixture is then poured into ice water, extracted with ether and the ether extract washed with dilute alkali and then with water until neutral. After evaporation of the ether, the residual oil is subjected to a steam distillation to remove any unchanged 1,3-dichlor propene and any 1-chloro propene-1-ol-3 formed by the hydrolysis of 1,3-dichloro propene. The oil is separated from the water and dried at 110° in vacuo. It has the following chemical and physical properties.

*Analysis*

Nitrogen:
  Theory per cent 5.40
  Found do 5.94
Chlorine:
  Theory do 13.68
  Found do 12.42
Specific gravity 1.21
Index refraction 1.58 to 1.60

*Example 4.*—Preparation of a mixture of 4-methyl vinyl carbinyloxy diphenylamine:

and 4-crotyloxy diphenylamine (cis-trans):

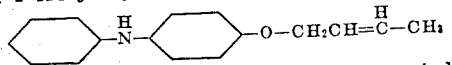

The preparation of this material is carried out as described for the preparation of gamma chloro allyloxy diphenylamine. 4-hydroxy diphenylamine (46 grams) is dissolved in a mixture of 22 cc. 35% sodium hydroxide and 50 cc. alcohol and treated with 22.5 grams of a mixture of methyl vinyl carbinyl chloride and crotyl chloride. The product, after treatment with steam, is dried in vacuo at 110° C. It amounts to 26.1 grams, and has the following physical and chemical properties.

*Analysis*

Nitrogen:
  Theory per cent 5.84
  Found do 5.92
Index of refraction 1.627
Specific gravity 1.110

These chemicals according to the present invention may be used as insecticides, as high pressure lubricant aids, and as anti-oxidants for rubber and the like.

Having thus described my invention, what I claim and desire to protect by Letters Patent is:

1. A 4-methallyloxy diarylamine.
2. 4-methallyloxy diphenylamine.

PHILIP T. PAUL.